Aug. 20, 1957  B. A. HOHMANN  2,803,473
VALVED PIPE JOINT EQUIPMENT FOR REFUELLING
AN AIRCRAFT IN FLIGHT
Filed July 16, 1951  5 Sheets-Sheet 1
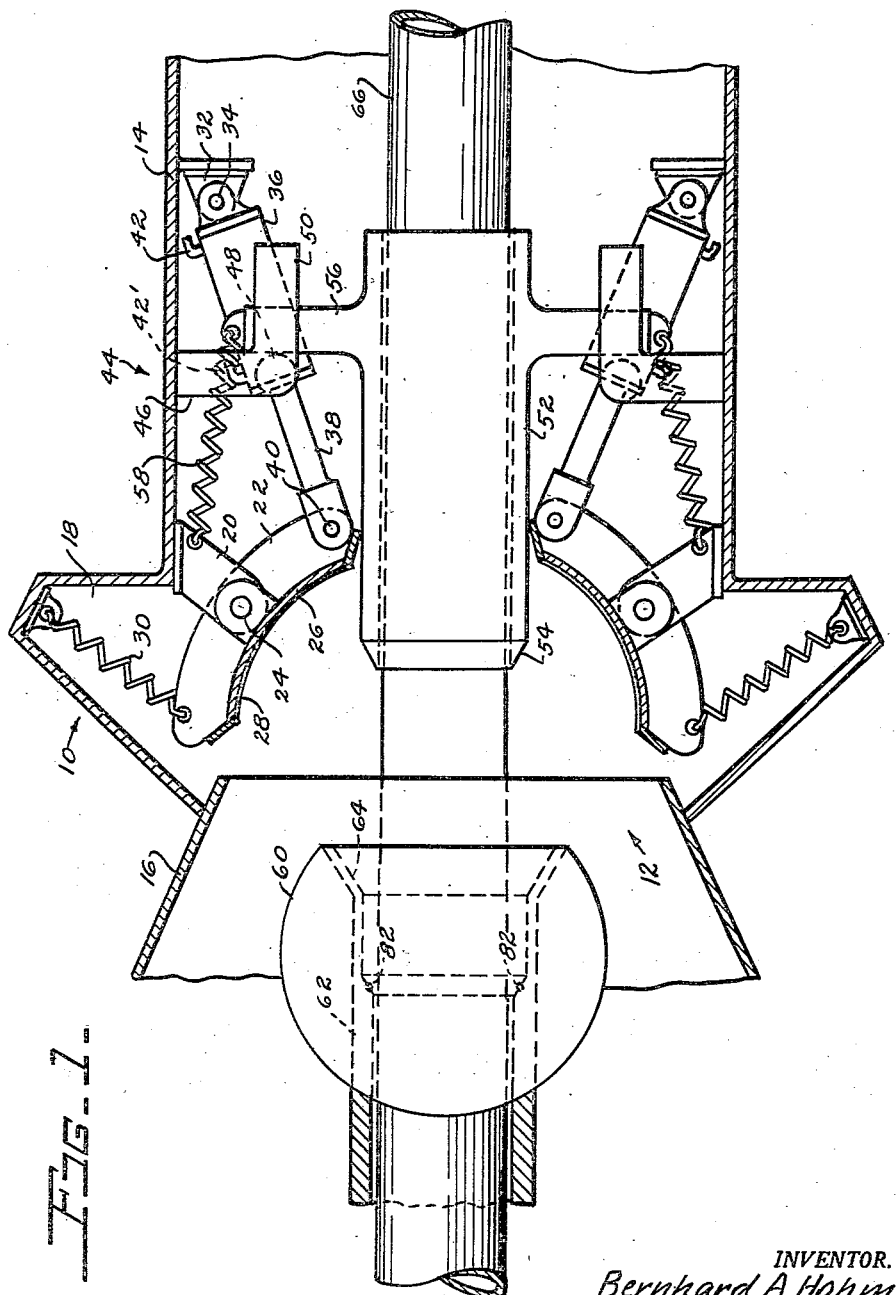
INVENTOR.
Bernhard A. Hohmann
BY Wade Koontz
and
Frederick W. Cotterman
ATTORNEYS

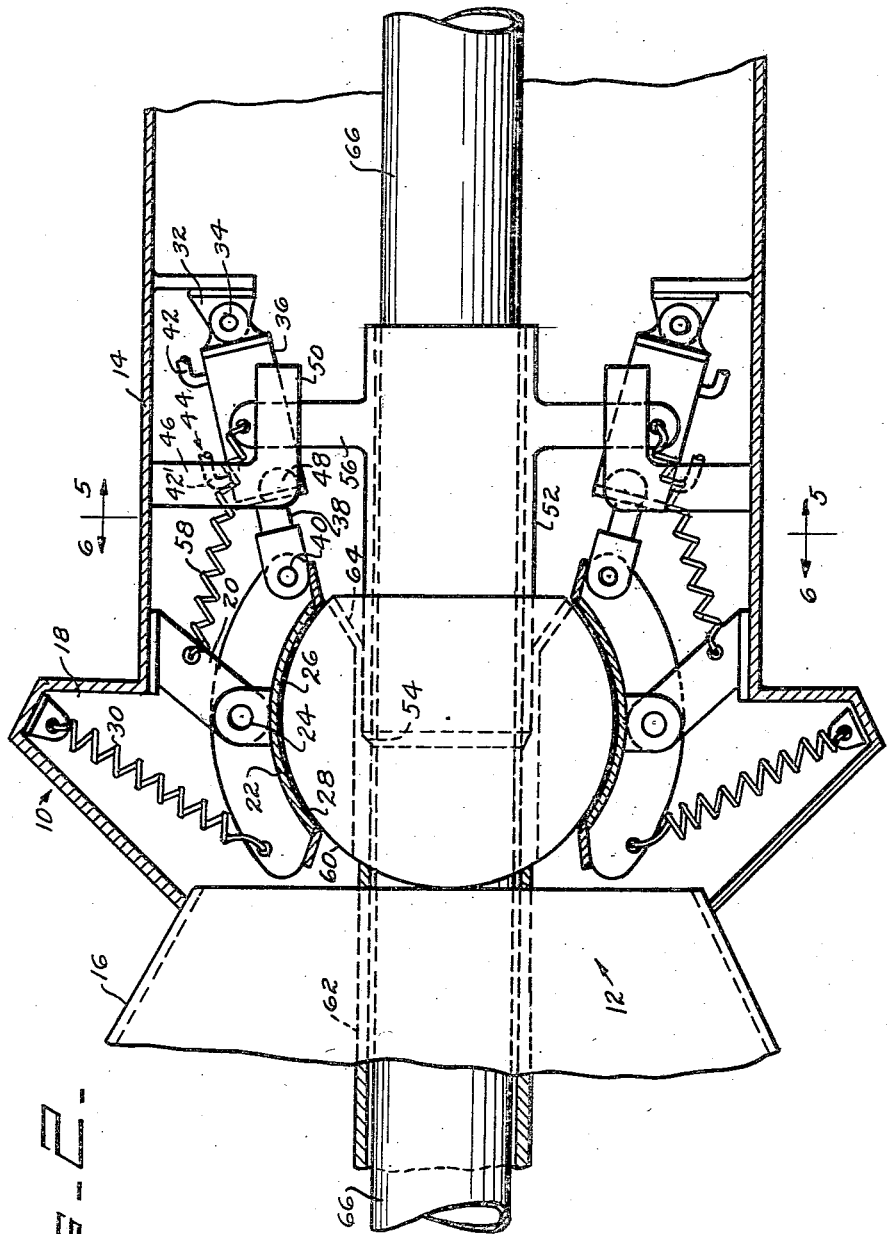

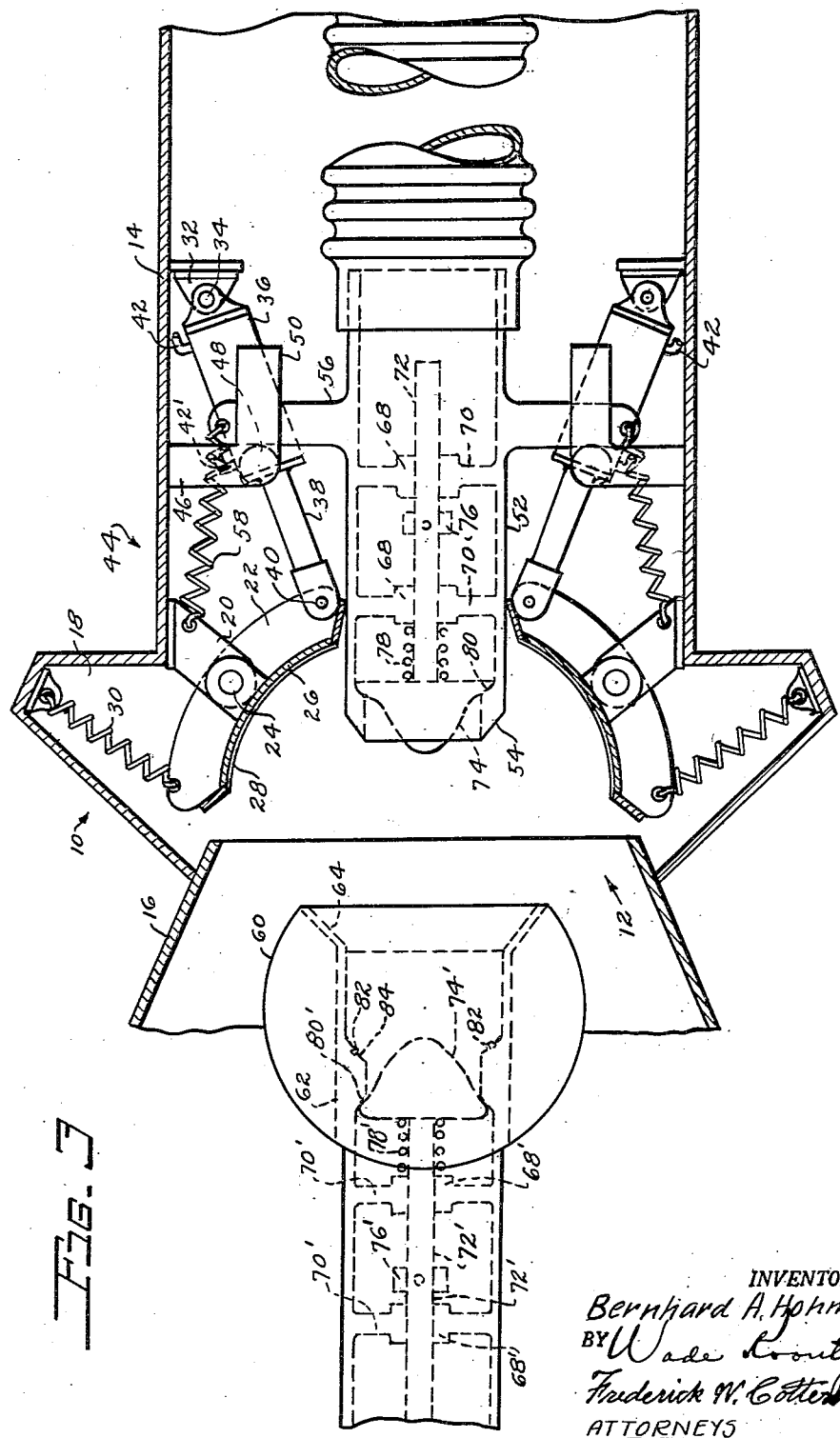

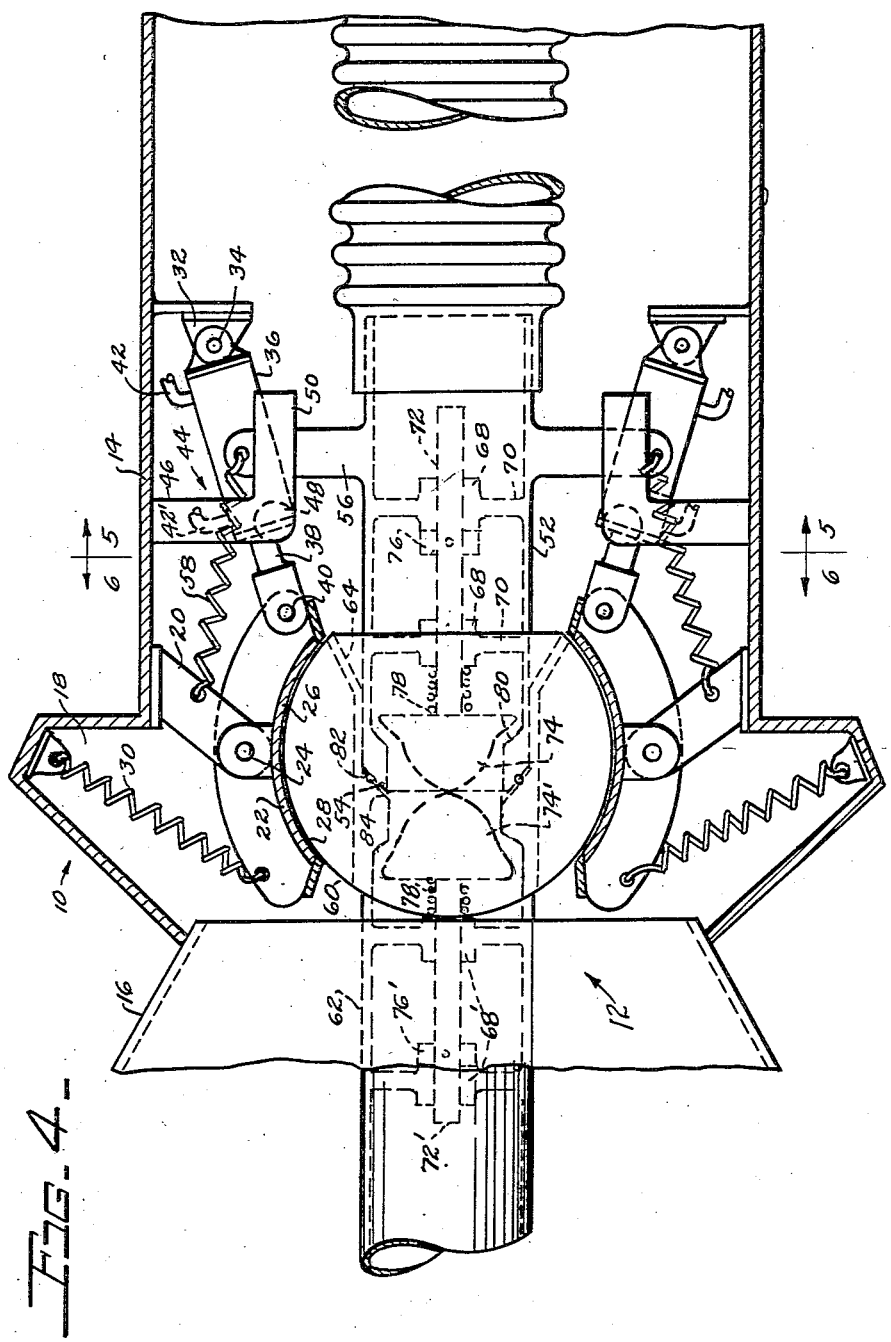

Aug. 20, 1957  B. A. HOHMANN  2,803,473
VALVED PIPE JOINT EQUIPMENT FOR REFUELLING
AN AIRCRAFT IN FLIGHT
Filed July 16, 1951  5 Sheets-Sheet 5

INVENTOR.
Bernhard A. Hohmann
BY Wade Looty AND
Frederick W. Cotterman
ATTORNEYS United States Patent Office 2,803,473
Patented Aug. 20, 1957

2,803,473

VALVED PIPE JOINT EQUIPMENT FOR REFUELLING AN AIRCRAFT IN FLIGHT

Bernhard A. Hohmann, Fairborn, Ohio, assignor to the United States of America as represented by the Secretary of the Air Force Application July 16, 1951, Serial No. 237,048

6 Claims. (Cl. 284—18)

(Granted under Title 35, U. S. Code (1952), sec. 266)

The invention described herein may be manufactured and used by or for the United States Government for governmental purposes without the payment to me of any royalty thereon.

This invention relates to a novel method of refuelling an aircraft in flight, and particularly to the special equipment required for carrying the novel method into effect.

Current practice in refuelling an aircraft in flight consists in providing a cable with a weight at one end, attaching the other end of the cable to one of the aircraft, either the fighter or the tanker, and dangling the weighted end, providing a second cable with a harpoon attached to one end and the other end attached to the other aircraft, shooting the harpoon at the weight to entangle the cable ends to which the weight and harpoon are attached, fastening one end of a hose to one of the cables and hauling in the cable by its other end to connect the two aircraft with the hose.

The refuelling equipment includes a cable and winches, a number of fittings, hoses, connection parts, etc. The main difficulty of this procedure is the catching of the cable and the final connection by means of the hose.

Another method of refuelling in flight which has received some consideration is that in which a trailer tank is towed without a crew. In this procedure, the trailer tank with jettisonable undercarriage and wings, is towed by the receiver all of the time from take-off to the refuelling process.

The main difficulties with the procedures outlined are the dynamic instabilities and unsatisfactory flight characteristics. Even if these difficulties are overcome, a very accurate construction would be required. Further investigation is advisable, particularly if it is to be used for the faster jet propelled aircraft.

The trailer refuelling procedure, however, has the advantage that no connection in flight has to be accomplished and that it is independent of weather conditions provided the trailer is equipped with de-icers. The greatest advantage, however, is that the receiver does not have to contact another aircraft in flight and is independent, since only one aircraft is required for any mission. Economical and tactical reasons may determine whether this method will be used in the future.

The present invention is directed, in the main, to the refuelling of aircraft in flight by means of a substantially rigid connection between the receiver and the tanker through which the fuel is transferred, which connection is made and unmade in flight without cables, ropes or similar devices.

Special equipment for making flow connection between the receiving and servicing craft is shown in the drawings, wherein:

Fig. 1 shows my invention in its simplest form with the ball on the nose of the fighter about to make coupling connection with the socket in the tail of the tanker.

Fig. 2 shows the device after the ball and socket connection has been made.

Fig. 3 is a view substantially like Fig. 1 except that a valving mechanism is included which automatically makes fluid connection between the fighter and the tanker coincidentally with the making of coupling connection.

Fig. 4, like Fig. 2, shows the device after coupling connection has been made and the fluid connection has also been made.

Figure 5:
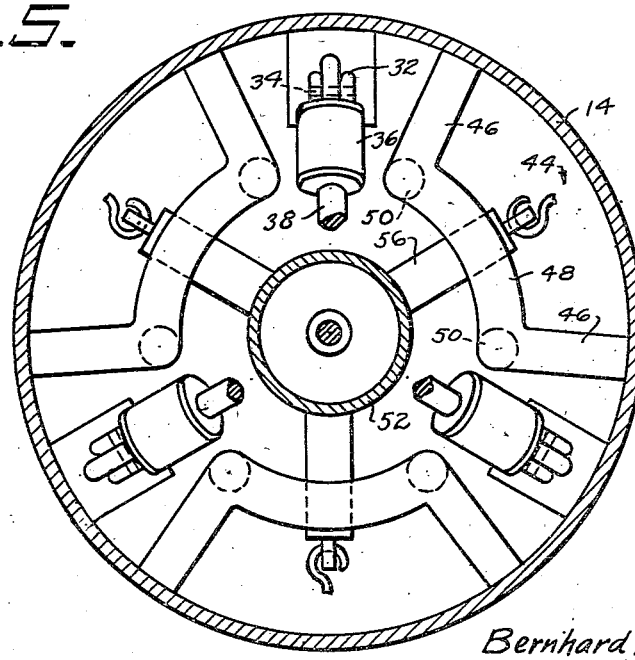

Fig. 5 is a transverse section taken at 5—5 of Fig. 4.

Figure 6:
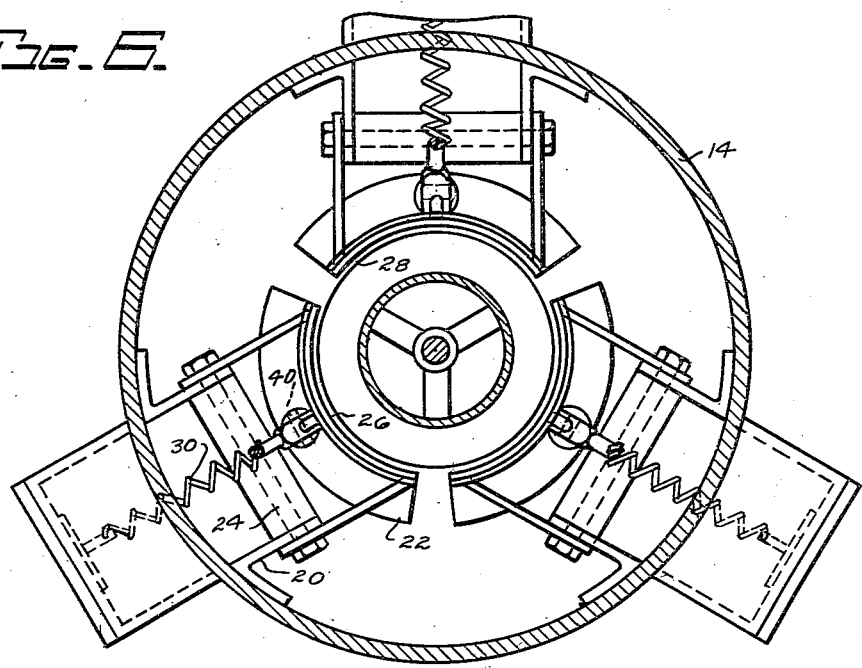

Fig. 6 is a transverse section taken at 6—6 of Fig. 4.

In order to provide space for the coupling which is the subject of this invention, a large bomber may preferably be converted into a tanker whereby the space in the tail of the bomber no longer required for a tail gunner's compartment may be used.

Concentrically positioned and rigidly secured in the space thus provided is the socket housing 10 of the ball and socket coupling 12 herein disclosed. This housing comprises a cylindrical portion 14 and a frustoconical portion 16 joined together by an annular chamber 18.

Rigidly secured in the housing 10 are a number of circumferentially spaced brackets 20 to which the socket jaws 22 are hinged as at 24. The inner surface 26 of the socket jaws 22 are spherical and may be faced with a thin layer of brake lining 28. Springs 30 hold the socket jaws 22 in their wide open condition.

A second series of brackets 32 equal in number to the brackets 20 are carried on the inside of the housing portion 14. Brackets 32 have hinged thereto, by a hinge pin 34, a hydraulic cylinder 36, the piston rods 38 of which are bifurcated at the outer end and hinged to the ends of the jaws 22 by a hinge pin 40.

The hydraulic cylinders 36 serve a twofold purpose, i. e., as a shock absorber for taking the impact when coupling is effected, and as a means of releasing the coupling when it is to be disconnected. Small pipes 42 and 42' flow connect the ends of the cylinder 36 to appropriate hydraulic controls (not shown).

A series of brackets 44, see Fig. 5, have end portions 46 extending radially inward from the wall of the housing part 14, the radial portions 46 being joined by circumferential portions 48. Posts 50 extend axially from the ends of the circumferential portions.

A concentric tubular member 52 is beveled in the front end as at 54 and has radial arms 56 which are yieldably held against the circumferential portions 48 of the bracket 44 by springs 58.

The foregoing description applies to the socket member of the ball and socket coupling 12, Fig. 1, when it is in its uncoupled state and while the description indicates that it is housed in the tail of the tanker or the receiver, it should be understood that it may, with equal facility, be housed in the nose of the tanker, or in the nose or the tail of the fighter.

The ball member of the coupling 12 is shown in Fig. 1 a little apart from its final coupled position. It consists of a ball 60 into which one end of a pipe 62 is securely fastened, the other end of the pipe being fast in the nose or tail of the tanker or fighter whichever the case may be. The outer end of the opening through the pipe 62 is beveled as at 64 whereby the beveled end 54 of the pipe 52 may be more readily guided into its final coupled position.

In guiding the ball 60 into the socket, the ball may be centered by contact with the sides of the frustoconical member 16 which will center the ball with the wide open jaws 22, so that the pressure of the ball against the inner ends of the jaws turns the jaws about the pin 24 to their final gripping position as in Fig. 2, the hydraulic fluid in the cylinders 36 meanwhile softening the shock which may be regulated by regulating the flow through pipes 42 and 42'. When coupling is completed, as shown in Fig. 2, a synthetic rubber hose 66 may be pushed through the pipes 35 and 36 and the ends manually connected to the several tanks of the two aircraft.

The coupling shown in Figs. 1 and 2 has the following advantages:

1. After the coupling of the two aircraft is completed, the coupled aircraft can fly in any weather.
2. The refueling process is feasible at cruising speeds without difficulty.
3. It is possible to employ high pressure and large fuel pipes which speeds up the transfer of the fuel.
4. The weight of the necessary refuelling equipment is not great.
5. After the connection of the two aircraft is made, no difficult flight procedure is necessary during the refuelling process.
6. In an emergency, the two aircraft may be disconnected, one from the other, in minimum time.

The chief disadvantage of the coupling shown in Figs. 1 and 2 is that while mechanical coupling connection may be made automatically, fluid flow connection must still be made manually.

In Figs. 3 through 6 we disclose a valve mechanism fitted into our coupling mechanism whereby both the mechanical coupling and the fuel flow connection are coincidentally and automatically made.

In the improved exemplificaton of an invention shown in Figs. 3 through 6, the mechanism for effecting mechanical coupling is the same as shown and described with reference to Figs. 1 and 2. The valve mechanism, however, is unique. In the improved coupling there are two valves, one in the socket part of the coupling and the other in the ball part, and, whenever mechanical coupling is effected, the act of making the coupling opens both valves, and, when mechanical coupling is disconnected, the act of unmaking the coupling closes both valves. Both valves are at the extreme ends of the fuel passageways of the ball part and the socket part of the coupling, whereby minimum fuel is lost when the coupling parts are separated.

Referring to the improved coupling shown in Figs. 3 through 6, and particularly to the tubular fuel conduit part 52, which is in the socket portion of the coupling, the tubular part 52 is provided with two spaced apart bearing hubs 68 each supported by arms 70. Hubs 68 are bored to slidably receive the valve stem 72, which, at the outer end, carries the valve head 74, and, intermediate the ends carries a stop collar 76 for limiting inward movement of the stem. An expansion spring 78 urges the valve head 74 into its seat 80.

Referring to the ball portion of the coupling, the tubular member 62 has two spaced apart bearing hubs 68' each supported by arms 70'. Hubs 68' are bored to slidably receive the valve stem 72', which, at the outer end carries the valve head 74', and intermediate the ends carries the stop collar 76' for limiting inward movement of the stem. An expansion spring 78' urges the valve head 74' onto its seat 80'. Valve heads 74 and 74' may preferably be made of synthetic rubber, and an O ring 82 should be provided for sealing where the beveled end 54 of the tubular member 52 seats on the bevel portion 84 of the tubular member 62.

The operation of my improved coupling may best be understood by reference to Figs. 3 through 6. Fig. 3 shows the coupling as it appears when the pilot of a fighter is just starting to enter the ball 60 into the frustoconical guide 16. When the ball is entered to the position shown in Fig. 3 it will be nearly enough centered to allow the beveled end 54 of the tubular member 52 to enter the frustoconical portion 64 of the tubular member 62. As the ball 60 is now moved into final position in the socket, it strikes the inner ends of the jaws 22, thereby pivoting the jaws on the hinge pins 24 thus closing them closely around the ball as seen in Fig. 4.

By restricting the outlets 42 of the hydraulic cylinders 36 by any suitable control means, the shock of making coupling connection is minimized. Also by closing both outlets 42 and 42' of the hydraulic cylinders 36, the jaws 22 may be locked in the closed position, Fig. 4. Likewise by moving a hydraulic fluid in at 42 and out at 42', the coupling will be changed from the closed condition Fig. 4 to the open condition Fig. 3.

The automatic opening and closing of the valves contained in the cylindrical members 52 and 62 is accomplished substantially as follows:

When the ball 60 has moved axially until the valve heads 74 and 74' touch each other, any further movement of the ball will cause the springs 78 and 78' to be compressed until valve movement is arrested by the stop collars 76 and 76' engaging the inner hubs 68 and 68' whereupon the valves 74 and 74' will be off their seats and the beveled end 54 of the member 52 will be against the beveled end 84 of the member 62. Further movement of the ball 60 to its final position cannot further change the relation of the valves, so it moves the entire tubular member 52 and the arms 56 inward, off the circumferential parts 48 of the brackets 44, against the resistance of the springs 58, as seen in Fig. 4, where the valves are both open and the seal 82 is clamped between beveled surfaces 54 and 84 by the springs 58.

The advantages of the modifications shown in Figs. 3 through 6 are obvious, for the single act of inserting the ball end of the coupling into the socket end makes mechanical connection of the coupling parts as well as flow connection through the coupling by means of the unique valve mechanism, and the single act of withdrawing the ball end of the coupling from the socket end unmakes the mechanical connection and closes the valve mechanism.

I claim:

1. An aircraft refuelling device for transferring fuel between two aircrafts in flight comprising a spherical shape or ball element fixed to an end portion of one of the aircrafts and formed with a concentric fuel passage therethrough leading to that aircraft and terminating in a concentric tube receiving socket within the ball member having a flared tube receiving entrance at one side of the ball member; a tubular supporting housing fixed to the opposite end of the other aircraft and a complementary fuel delivery tube element mounted on said tubular supporting housing formed with a fuel delivery conduit leading to said other aircraft, said fuel delivery tube element terminating in a fuel delivery tube adapted for reception within the tube receiving socket and formed with a beveled end, ball coupling jaw members surrounding the fuel delivery tube in radially spaced relation thereto, said tubular supporting housing surrounding said jaw members and delivery tube, said housing having an outwardly flared entrance concentrically arranged relative to the delivery tube to receive, align and centralize the ball element and tube socket relative to jaw members and fuel delivery tube upon relative fuel delivery coupling movements thereof toward the jaw members, said coupling jaw members comprising a plurality of segmental concave contour jaws pivotally arranged within the housing, rearwardly of said flared entrance, in substantially equally spaced relation around the axis of the housing, each jaw member having an inner spherical concave ball surface engaging contour with a radius substantially conforming to the radius of the ball element, bracket means fixed within the housing pivotally supporting the jaw members at the back of their ball element contact surfaces in rearwardly spaced relation to the outer ends of the jaw members, positioning the intermediate portions of ball contacting surfaces radially from the axis of the fuel delivery tube at a distance substantially equal to the radius of the ball element, and selectively controlled fluid pressure operated means connected between the housing and the jaw members for controlling rocking movement of said jaw members.

2. Aircraft refuelling in flight apparatus as claimed in claim 1, in which said jaw members are pivoted at their backs substantially midway between their inner and outer ends, and include spring means connected between the jaw members and the housing for rocking the jaw members about their pivots to move the outer ends of the jaw members radially outward and the inner ends radially inward.

3. Aircraft refuelling in flight apparatus as claimed in claim 2, in which the spring means are connected between the housing and the front ends of the jaws and the fluid pressure operated means are connected between the housing and the rear ends of the jaws.

4. Aircraft refuelling in flight apparatus as claimed in claim 1, including guide means fixed within the housing for slidably supporting the fuel delivery tube for axial sliding movement, retractable from an extended position between the jaw members, when the fuel delivery tube is received in the tube receiving socket, and includes spring means operable between the housing and the slidable fuel delivery tube yieldingly urging the fuel delivery tube to its extended position, together with stop means fixed within the housing for limiting the extending movement of the fuel delivery tube by the spring means.

5. Aircraft refuelling in flight apparatus as claimed in claim 1 including cooperative spring closed valve means in said tubular fuel delivery passage, and in said fuel delivery tube, openable in directions respectively away from the respective flared receiving opening in the tube receiving socket and the outer end of the fuel delivery tube, separate stop means in the fuel delivery tube and the tube receiving socket for limiting the respective opening movements of the valve means, cooperating valve actuating means being carried by each of the valve means for impinging engagement with each other to open said valve means incident to material insertion of the fuel delivery tube into the tube receiving socket during movement of the ball element into jaw rocking actuating engagement with the jaw members to establish refuelling fluid communication between the two aircrafts in flight through said fuel delivery tube and the interior of said tube receiving socket.

6. An aircraft refuelling device for transferring fuel between two aircrafts in flight comprising a spherical shape or ball element fixed to an end portion of one of the aircrafts and formed with a concentric fuel passage therethrough leading to that aircraft and terminating in a concentric tube receiving socket within the ball member having a flared tube receiving entrance at one side of the ball member; a tubular supporting housing fixed to the opposite end of the other aircraft, and a complementary fuel delivery tube element mounted on said tubular supporting housing formed with a fuel delivery conduit leading to said other aircraft, said fuel delivery tube element terminating in a fuel delivery tube adapted for reception within the tube receiving socket and formed with a beveled end, ball coupling jaw members surrounding the fuel delivery tube in radially spaced relation thereto, said tubular supporting housing surrounding said jaw members and delivery tube, said housing having an outwardly flared entrance concentrically arranged relative to the delivery tube to receive, align and centralize the ball element and tube socket relative to jaw members and fuel delivery tube upon relative fuel delivery coupling movements thereof toward the jaw members, said coupling jaw members comprising a plurality of segmental concave contour jaws pivotally arranged within the housing, rearwardly of said flared entrance, in substantially equally spaced relation around the axis of the housing, each jaw member having an inner spherical concave ball surface engaging contour with a radius substantially conforming to the radius of the ball element, bracket means fixed within the housing pivotally supporting the jaw members at the back of their ball element contact surfaces in rearwardly spaced relation to the outer ends of the jaw members, positioning the intermediate portions of ball contacting surfaces radially from the axis of the fuel delivery tube at a distance substantially equal to the radius of the ball element, and selectively controlled fluid pressure operated means connected between the housing and the jaw members for controlling rocking movement of said jaw members, in which said jaw members are pivoted at their backs substantially midway between their inner and outer ends, and includes spring means connected between the jaw members and the housing for rocking the jaw members about their pivots to move the outer ends of the jaw members radially outward and the inner ends inward, said spring means being connected to the front ends of the jaw members and the fluid pressure operated means being connected between the housing and the rear ends of the jaws, said fluid pressure operated means comprising hydraulic cylinder and piston members, each operatively connected at one end to one of the jaw members intermediate its side edges and rearwardly of its pivot and operatively connected at its opposite end to the interior of the housing, adjacent the interior wall thereof rearwardly of the inner ends of the jaw members, the hydraulic cylinders having fluid conduit means connected thereto for selectively admitting or discharging a pressure fluid into or from the opposite ends thereof, to control the adjusted positions of the jaw members, in ball element receiving and holding positions.

References Cited in the file of this patent

UNITED STATES PATENTS

| | | |
|---|---|---|
| 122,326 | Mabie et al. | Jan. 2, 1872 |
| 999,946 | Babst et al. | Aug. 8, 1911 |
| 1,984,865 | Creveling | Dec. 18, 1934 |
| 2,199,588 | Cobham et al. | May 7, 1940 |
| 2,512,939 | Hollerith | June 27, 1950 |
| 2,536,602 | Goett | Jan. 2, 1951 |
| 2,582,609 | Steele | Jan. 15, 1952 |

FOREIGN PATENTS

| | | |
|---|---|---|
| 571,643 | Great Britain | Sept. 3, 1945 |